United States Patent
Dohmann et al.

(10) Patent No.: US 7,077,639 B2
(45) Date of Patent: Jul. 18, 2006

(54) SPIRAL-WEBBED MANDREL

(75) Inventors: Heinrich Dohmann, Hoexter (DE); Reinhard Witt, Bad Oeynhausen (DE)

(73) Assignee: American Maplan Corporation, McPherson, KS (US)

( * ) Notice: Subject to any disclaimer, the term of this patent is extended or adjusted under 35 U.S.C. 154(b) by 234 days.

(21) Appl. No.: 10/364,307

(22) Filed: Feb. 10, 2003

(65) Prior Publication Data
US 2003/0222375 A1   Dec. 4, 2003

(30) Foreign Application Priority Data
Feb. 13, 2002  (DE) ............... 102 05 842

(51) Int. Cl.
*B29C 47/38*   (2006.01)
(52) U.S. Cl. ............... 425/197; 425/382.4; 425/380; 425/467; 425/381.2
(58) Field of Classification Search ............. 425/381.2, 425/190, 467, 380, 197, 382.4
See application file for complete search history.

(56) References Cited

U.S. PATENT DOCUMENTS

| 1,679,545 A | * | 8/1928 | Roth ................... 425/380 |
| 1,809,837 A | * | 6/1931 | Ewart .................. 425/380 |
| 4,268,239 A | * | 5/1981 | Herrington, Jr. ........ 425/467 |

FOREIGN PATENT DOCUMENTS

DE  29813412 U1  7/1998

OTHER PUBLICATIONS

W. Michaeli; Extrusionswerkzeuge für Kunststoffe und Kautschuk S. 156/157.

* cited by examiner

*Primary Examiner*—Joseph S. Del Sole
(74) *Attorney, Agent, or Firm*—Hamilton, Brook, Smith & Reynolds, P.C.

(57) ABSTRACT

An mandrel for extrusion of hollow bodies, such as, polyvinyl chloride (PVC) hard, compact, and foamed pipes, includes an inner collar and an outer collar, and webs radially joining the inner collar and outer collar. The webs can be arranged twisted and/or offset in radial direction.

7 Claims, 4 Drawing Sheets

SPIRAL-WEBBED MANDREL

RELATED APPLICATION

This application claims priority under 35 U.S.C. § 119 to German Application No. DE 102 05 842.3, filed Feb. 13, 2002, the entire teachings of which are incorporated herein by reference.

BACKGROUND OF THE INVENTION

Prior art extrusion methods have used double-webbed mandrel dies for extrusion of hollow bodies, such as polyvinyl chloride (PVC) hard, compact, and foamed pipes. The double-webbed mandrel die has an inner collar, an outer collar, and a series of webs, which radially join the inner collar and the outer collar.

Double-webbed mandrel dies for production of pipe are known, for example, from a brochure of Battenfeld Extrusionstechnik GmbH entitled "Pipe Extrusion Systems" dated October 2000. Double-webbed mandrel dies are also known in U.S. Pat. No. 4,509,907, issued to Ratheiser on Apr. 9, 1985, the entire teachings of which are incorporated herein by reference.

Prior art dies shape the outer and the inner contour of the pipe using a sleeve and a mandrel. The sleeve and the mandrel are be joined together to withstand the wall friction forces and the resulting pressure forces of the extrudate (melt). The mandrel is joined to the sleeve by a series of webs. However, the pressure buildup in the melt is so great that adequate pipe quality is only achieved with sufficient subsequent compression and a limiting of the web height.

In known double-webbed pipe mandrel dies, the connection between the sleeve and the mandrel is provided by two sets of series of webs, which are staggered in a circumferential direction and joined by a middle collar. This technique offers two advantages. First, the pressure buildup in the melt is not as severe because less compression work is needed and a larger annular gap between sleeve and mandrel can be created. Furthermore, this allows for excellent control of wall thickness of the pipe when using a high production rate. There are no continuous web markings and the mechanical properties of the pipe are increased when using this type of double-webbed pipe mandrel.

SUMMARY OF THE INVENTION

To control and regulate the extrusion process, supply lines are lead through the double-webbed mandrel head. The supply lines may be power lines, or control lines used in conjunction with temperature probes, heating elements or the like devices used for interior control of the extrusion process. One drawback in the prior art techniques is that the supply lines need to be heavily folded because the webs are staggered between the individual collars. Thus, it is necessary to span the offset between the two webs within the middle collar by the supply line. In the known systems, a groove is provided in the middle collar to lead the supply lines through the mandrel head. Once the supply lines are in place, the groove is closed to protect the supply lines. The manufacturing and assembly expense required for this known technique is considerable, and is a large portion of the entire manufacturing expense for the die. Furthermore, the operating safety of the die is considerably reduced because of the above expenditures (malfunctioning of the improperly laid supply lines).

In accordance with one embodiment of the invention, a method and apparatus are provided which can eliminate the need for the middle collar, such that the supply lines do not have to be folded. The spiral-webbed mandrel die includes an inner collar, an outer collar, and webs radially joining the inner collar and the outer collar. In a particular embodiment, the webs are twisted and/or offset in a radial direction.

As a further enhancement, the axis of rotation of the web is in the vicinity of the onflow curve, so that at least no continuous web markings are formed. The flow of melt arrives at the webs in a radial line, but converges at a meeting point that is radially offset from the onflow axis.

This web arrangement allows for a borehole to extend from the outer collar through at least one web to the inner collar. Using the borehole, the supply lines, for example, power lines, can be led from the outside of the outer collar through the web to the inside of the inner collar, without accounting for the offset of the webs. Consequently, the supply lines do not have to be folded.

The axis of rotation of the webs near the onflow curve can produce a relatively large displacement of the outflow axes in the circumferential direction of the die. Another feature of the web geometry is that it can be streamlined for a particular torsion. That is, the cross-sectional geometry can vary along the axis of rotation and in keeping with technical flow requirements to achieve increased mechanical properties of the pipe.

The die geometry can allow for continuous shifting of the outflow axes in the circumferential direction, which produces a blurring of the web markings in the extruded pipe and provide for increased mechanical properties of the pipe. The supply borehole can be made concentrically to the axis of rotation by choosing the die geometry. This reduces the fabrication and assembly cost and the consequent operating security has been distinctly enhanced. The middle collar can now be eliminated.

Another feature of the web arrangement is the torsion about the axis of rotation or the offset from the radial axis, the positioning of the axis of rotation, and the streamlined conditions in each segment of the web. In particular embodiments, the trend of the angle of rotation is varied along the axis of rotation, that is the offset between the onflow curve and outflow curve is different.

More advantageously, the cross-section of one web is streamlined, for example, teardrop-shaped, thereby advantageously influencing the conditions of flow around the web.

BRIEF DESCRIPTION OF THE DRAWINGS

The foregoing and other objects, features and advantages of the invention will be apparent from the following more particular description of various embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
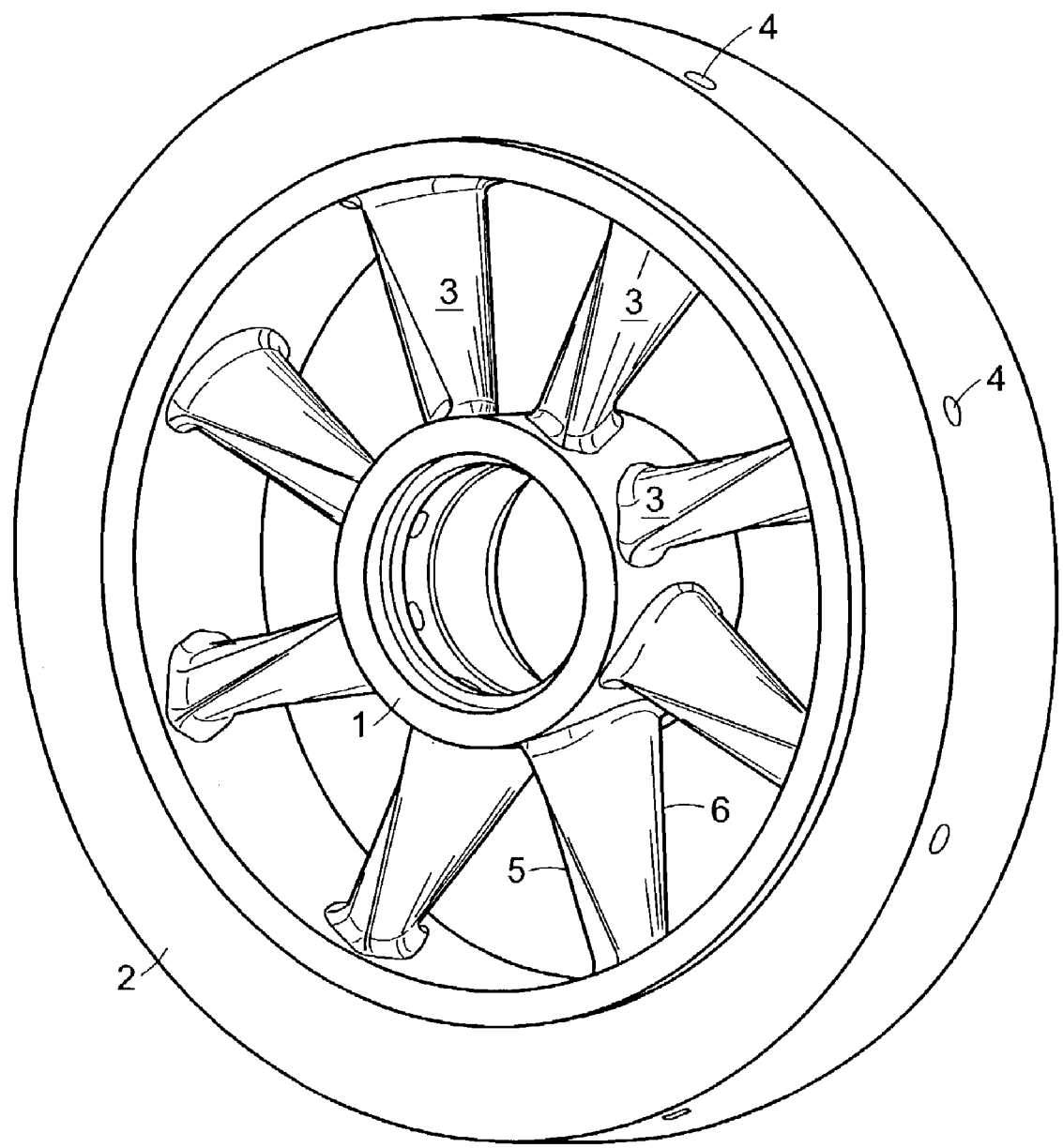
FIG. 1 is a perspective view of a spiral-webbed mandrel in accordance with one embodiment of the invention.

As shown in FIG. 1, a mandrel die is depicted, in which an inner collar 1 and an outer collar 2 are joined by webs 3. A borehole 4 extends from the outside of the outer collar 2 via one of the webs 3 into the inner collar 1 so that supply lines can be led into the device from the outside. The supply lines may be power lines, or control lines used in conjunction with temperature probes, heating elements or the like devices used for interior control of the extrusion process.

Figure 2:
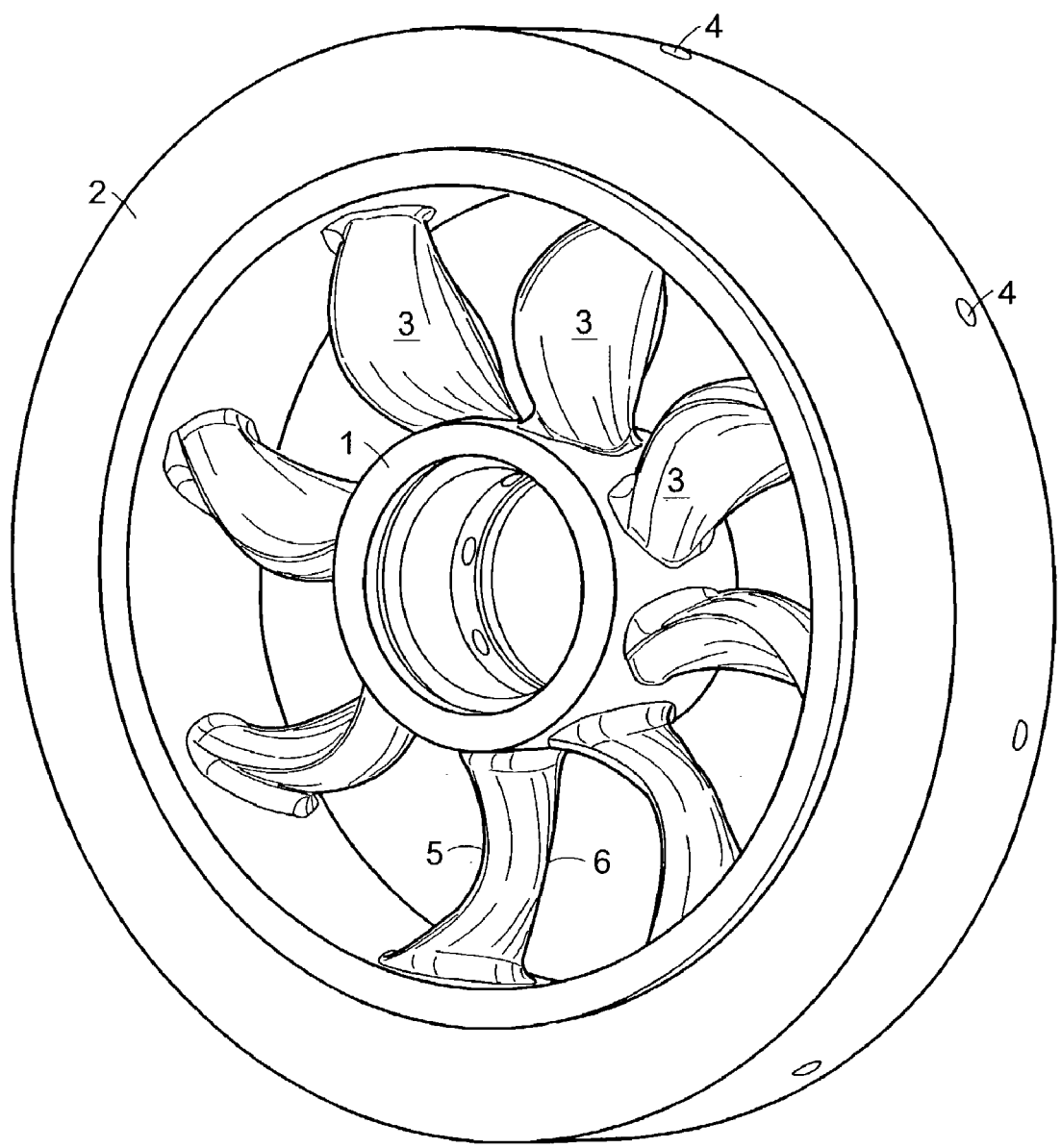
FIG. 2 is a perspective view of a spiral-webbed mandrel in accordance with an alternative embodiment of the invention.
Figure 3:
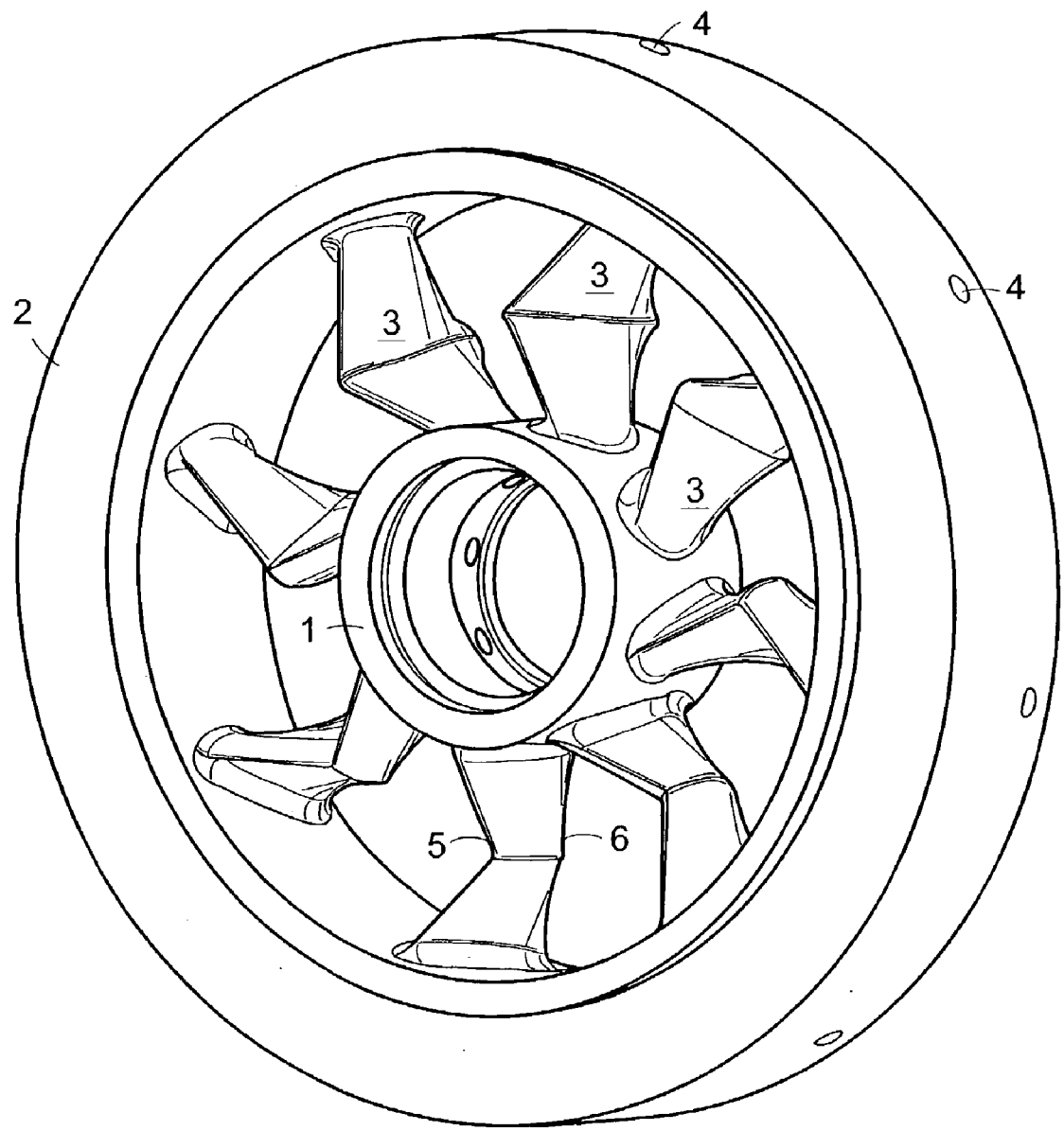
FIG. 3 is a perspective view of a spiral-webbed mandrel in accordance with another embodiment of the invention.

These webs 3 are twisted about a radial axis relative to borehole 4, so that the onflow curve 5 is radially offset from the outflow curve 6. Embodiments of the invention place few limits on the configuration of the webs 3. The twisting or winding of a web, as shown in FIG. 2, can be spiral-shaped with a continuous onflow curve 5 and outflow curve 6 or, as shown in FIG. 3, discontinuous with a folded trend for the onflow curve 5 and outflow curves 6. In all embodiments of the present invention, the melt is divided on the onflow side of the web, in the extrusion direction, and converges at the outflow side of the web so no web markings occur to provide for increased mechanical properties of the pipe. The onflow curve 5, i.e., the region of a web which divides the melt, has a different trend seen spatially than the outflow curve 6, i.e., the region of the web behind which the melt again flows together, and a borehole 4 or a channel can be made through the web, in order to lead in the supply lines from the outside without excessively straining them.

Figure 4:
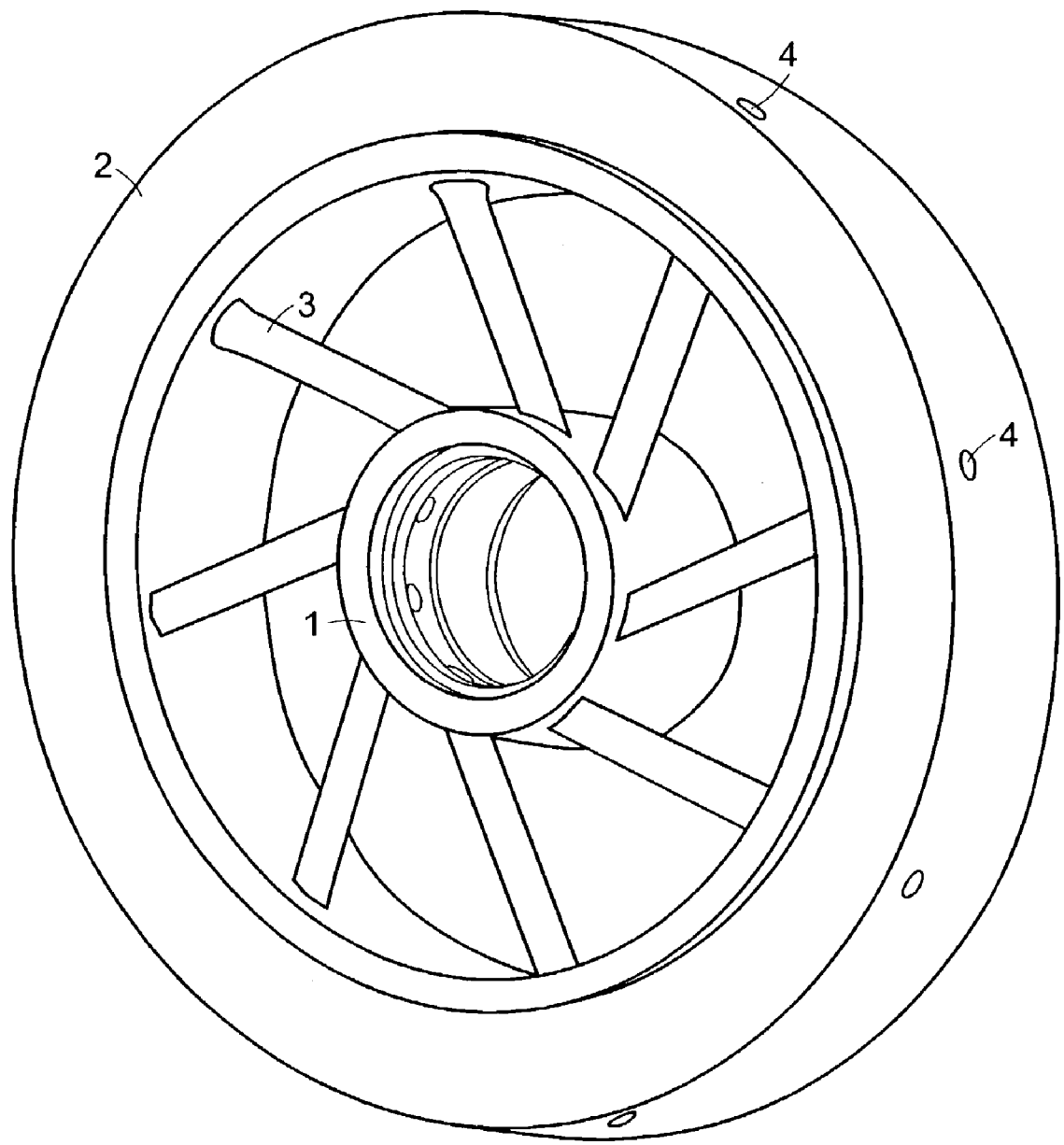
FIG. 4 is a perspective view of a spiral-webbed mandrel in accordance with another embodiment of the invention.

As shown in FIG. 4, one alternative configuration of the spiral-webbed mandrel die is to offset the webs 3 in the radial direction. The connection of a web 3 to the outer collar 2 has a different radial axis than the connection of this web to the inner collar 1. However, this configuration has limits, where the size of the offset can only be chosen so a borehole 4 can still be brought in from the outside of the outer collar 2 into the inside of the inner collar 1.

With the proposed device, plastic parts having a hollow can be extruded, which applies not only to pipes, but also profile sections such as window frames or the like.

While this invention has been particularly shown and described with references to various embodiments thereof, it will be understood by those skilled in the art that various changes in form and details may be made therein without departing from the scope of the invention encompassed by the appended claims.

What is claimed is:

1. An apparatus for the extrusion of hollow bodies comprising:
   an inner collar;
   an outer collar;
   a plurality of web segments radially joining the inner collar and the outer collar to form a web, wherein an outflow curve of each web segment has a different trend from an onflow curve of its respective web segment; and
   a borehole that extends from the outer collar through at least one of the web segments to the inner collar, wherein each web segment is twisted about a radial axis relative to its borehole.

2. The apparatus of claim 1, wherein each web segment is offset in a radial direction.

3. The apparatus of claim 1, wherein each web segment is streamlined in cross-section.

4. The apparatus of claim 3, wherein each web segment is teardrop-shaped in crass-section.

5. The apparatus of claim 1, wherein the apparatus is configured to form hollow bodies.

6. The device of claim 1, wherein the onflow curve of each web segment is continuous.

7. The device of claim 1, wherein the onflow curve of each web segment is discontinuous with a folded trend.

* * * * *

UNITED STATES PATENT AND TRADEMARK OFFICE
CERTIFICATE OF CORRECTION

| | | |
|---|---|---|
| PATENT NO. | : 7,077,639 B2 | Page 1 of 1 |
| APPLICATION NO. | : 10/364307 | |
| DATED | : July 18, 2006 | |
| INVENTOR(S) | : Heinrich Dohmann and Reinhard Witt | |

It is certified that error appears in the above-identified patent and that said Letters Patent is hereby corrected as shown below:

Column 4
Claim 4, line 29, delete "crass-section" and insert --cross-section--.

Signed and Sealed this

Twenty-sixth Day of December, 2006

JON W. DUDAS
*Director of the United States Patent and Trademark Office*